Figure 1:
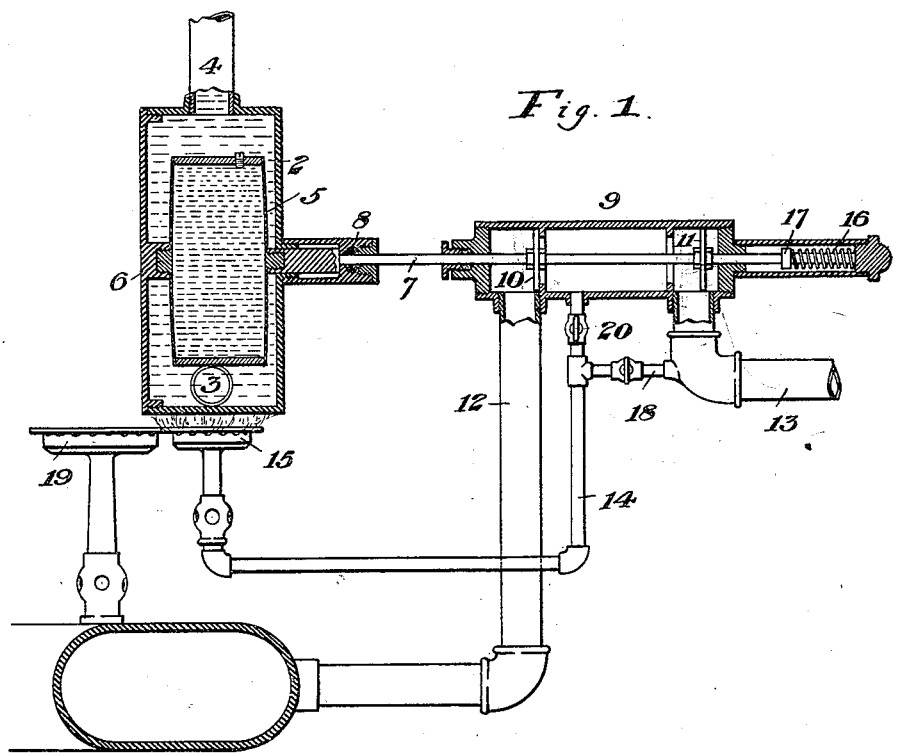

No. 667,653. Patented Feb. 5, 1901.
H. F. GABEL.
SAFETY REGULATOR FOR WATER HEATERS.
(Application filed Oct. 25, 1897. Renewed Jan. 10, 1901.)

(No Model.) 2 Sheets—Sheet 1.

WITNESSES

INVENTOR
Henry F. Gabel
by Bakewell & Bakewell
his attys.

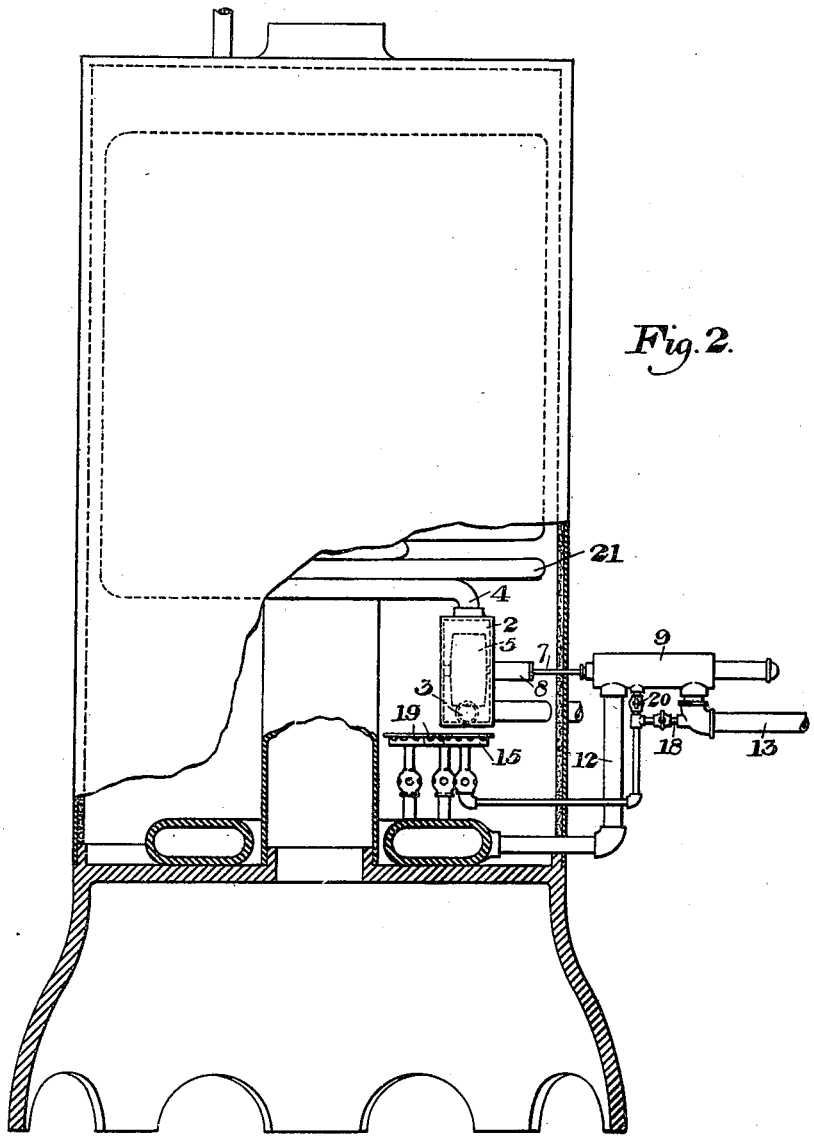

UNITED STATES PATENT OFFICE.

HENRY F. GABEL, OF PITTSBURG, PENNSYLVANIA, ASSIGNOR TO THE GABEL MANUFACTURING COMPANY, OF JERSEY CITY, NEW JERSEY.

SAFETY-REGULATOR FOR WATER-HEATERS.

SPECIFICATION forming part of Letters Patent No. 667,653, dated February 5, 1901.

Application filed October 25, 1897. Renewed January 10, 1901. Serial No. 42,815. (No model.)

*To all whom it may concern:*

Be it known that I, HENRY F. GABEL, a resident of Pittsburg, county of Allegheny, State of Pennsylvania, have invented a new and useful Improvement in Safety-Regulators for Water-Heaters, of which the following is a full, clear, and exact description, reference being had to the accompanying drawings, forming a part of this specification, in which—

Figure 1 is a side elevation, partly in section, of my improved apparatus; and Fig. 2 is a side elevation, partly broken away, showing one form of heater provided with my improved apparatus.

My invention relates to that class of regulators wherein a thermostat is employed which is connected to the gas-supply valve of the burner and arranged to open this valve when the temperature of the water in the heater is lowered beyond a certain point and to close the valve when the temperature of the water rises beyond this point, and it is designed to overcome the danger which was always present in this class of devices of the thermostat opening the gas-valve after the pilot-light has been accidentally extinguished. My invention overcomes this difficulty; and it consists in a valve connected with the thermostat and arranged to entirely cut off the gas-supply to the burners whenever the temperature of the water in the heater is lowered beyond a certain point.

In the drawings, 2 represents a hot-water chamber forming a part of the heater and having the inlet-pipe 3, leading from the heater, and the outlet-pipe 4, leading to the house system. Within this chamber is placed the thermostat 5, having the usual flexible end diaphragms and filled with any suitable liquid, such as gasolene. One of these ends is secured to the chamber at point 6, and to the central portion of the opposite end is secured the sliding rod 7, which extends through a suitable packing-gland 8 and through an external valve-chamber 9. Within the valve-chamber the rod is provided with two valves 10 and 11, 10 being the regulating-valve, normally operated by the thermostat to control the gas to the main burner-pipe 12, while 11 is an emergency-valve which will be drawn to its seat by the thermostat when the temperature of the water in the heater and chamber 2 is lowered beyond a certain limit.

13 is the gas-supply pipe leading into the end of the chamber 9, and 14 is the gas-supply pipe for the pilot-light 15, which serves to light the gas-burners whenever the regulator allows the gas to flow thereto. To insure the closing of this valve 11 when the pilot-light is accidentally extinguished, I preferably employ a spring 16, which surrounds an extended portion of the rod 7 and presses against the collar 17 thereon, tending to force the valve 11 to its seat.

18 is a valved branch pipe which directly connects the pipe 13 and 14 and by means of which gas may be supplied to the pilot-light after it is extinguished by the action of the thermostat.

19 represents an ordinary gas-burner which forms a portion of those employed for heating the water in the coils or pipes 21 of the heater.

The operation of my device is as follows: When the water in the heater and chamber 2 is at or above a desired point, the thermostat will hold the valve 10 against its seat, as shown in the figure, and cut off the supply of gas to the main burner. When the temperature of the water is lowered beyond this point, the valve 10 will be drawn away from its seat and gas will flow to the burners and pilot-light, the valve 11, however, remaining unseated. If while the main burner is unlighted the pilot-light is accidentally extinguished, the temperature of the water in the heater will of course fall and when it reaches a certain point it will draw the emergency-valve 11 against its seat and hold it in this position, thus cutting off all supply of gas both to the burners and pilot-light. The valve in the pipe 18 may then be opened, the valve 20 closed, and the pilot-light ignited. The valve 20 then being opened and the valve in pipe 18 closed the parts resume their normal functions as before.

The advantages of my invention will be apparent to those skilled in the art, since all danger of the gas-supply pipe being opened, allowing gas to escape after the pilot-light has been accidentally extinguished, is entirely done away with.

Many changes in the form of the thermostat and the valve actuated thereby may be made without departing from my invention, since I consider myself first to employ an emergency-valve which will be automatically closed when the water in the heater is lowered in temperature beyond a certain point.

I claim—

1. The combination of a water-receptacle, a gas-burner located in suitable proximity to the receptacle to heat water contained therein, a valve mechanism for controlling the flow of gas to the burner and a thermostat subjected to the heat from the burner and adapted to shift the valve mechanism, said parts being so arranged that the valve mechanism will be closed by the thermostat when heated above and cooled below certain predetermined temperatures, substantially as described.

2. The combination of a water-receptacle, a gas-burner located in suitable proximity to the receptacle to heat water contained therein, a valve mechanism for controlling the flow of gas to the burner and controlled by the flow of water through the receptacle, and a thermostat arranged in the circuit of the water to be heated and subjected to the heat from the burner and adapted to shift the valve mechanism to closed position when cooled below a certain predetermined temperature, substantially as described.

3. The combination of a water-receptacle, a gas-burner located in suitable proximity to the receptacle to heat the water contained therein, a valve mechanism for controlling the flow of gas to the burner, and a thermostat arranged in the circuit of the water to be heated and subjected to the heat from the burner and adapted to shift the valve to closed position when cooled below a certain predetermined temperature, substantially as described.

4. The combination of a main burner, a pilot-burner for the same, a supply for the main and pilot burners, valve mechanism located in the common supply, and a thermostatic regulator subjected to the heat of the burner and adapted to operate the valve mechanism to cut off the supply to the main burner when heated above a certain predetermined temperature and to cut off the supply to the main and pilot burners when cooled below a certain predetermined temperature.

5. The combination of a main burner, a pilot-burner for the same, a valve-chamber having two oppositely-facing valve-seats therein, valve mechanism in said chamber comprising two valves, a gas-supply pipe leading to the chamber on one side of the valve-seats and an outlet from the chamber to the main burner on the opposite side of the valve-seats, a supply-pipe for the pilot-burner leading from between the valve-seats, and a thermostatic regulator subjected to the heat of the burner and adapted to operate the valve mechanism to cut off the flow of gas to the main burner when heated above a certain predetermined temperature, and to cut off the flow of gas to both the main and pilot burners when cooled below a certain predetermined temperature.

6. The combination of a water-receptacle, a gas-burner located in suitable proximity to the receptacle to heat water contained therein, two valves adapted to be seated to check the flow of gas to the burner by opposite movements respectively, and a thermostat subjected to the heat from the burner for controlling said valves; substantially as set forth.

7. The combination of a water-receptacle, a gas-burner arranged in suitable proximity to heat water contained therein, two valves adapted to be seated to check the flow of gas to the burner by movements in opposite directions respectively, means for so shifting the valves and a thermostat subjected to the heat from the burner, for controlling the valve-shifting mechanism; substantially as set forth.

In testimony whereof I have hereunto set my hand.

HENRY F. GABEL.

Witnesses:
F. E. GAITHER,
C. E. MACKOWN.